(12) United States Patent
Monro

(10) Patent No.: US 8,036,466 B2
(45) Date of Patent: *Oct. 11, 2011

(54) SHAPE REPRESENTATION USING COSINE TRANSFORMS

(76) Inventor: Donald Martin Monro, Beckington (GB)

(*) Notice: Subject to any disclaimer, the term of this patent is extended or adjusted under 35 U.S.C. 154(b) by 964 days.

This patent is subject to a terminal disclaimer.

(21) Appl. No.: 11/654,494

(22) Filed: Jan. 17, 2007

(65) Prior Publication Data

US 2008/0170759 A1 Jul. 17, 2008

(51) Int. Cl.
*G06K 9/48* (2006.01)

(52) U.S. Cl. ........ 382/199; 382/115; 382/117; 382/181; 382/190; 382/195

(58) Field of Classification Search .................. 382/115, 382/117, 181, 190–208
See application file for complete search history.

(56) References Cited

U.S. PATENT DOCUMENTS

| 6,144,754 | A   | * | 11/2000 | Okano et al. | 382/117 |
| 6,714,665 | B1  | * | 3/2004  | Hanna et al. | 382/117 |
| 6,801,661 | B1  |   | 10/2004 | Sotak et al. |         |
| 2006/0147094 | A1 | | 7/2006  | Yoo          |         |

OTHER PUBLICATIONS

International Search Report for PCT/EP2008/050372 mailed Jul. 21, 2009.
Clarysse, P., "Two-dimensional Spatial and Temporal Displacement and Deformation Field Fitting from Cardiac Magnetic Resonance Tagging", *Medical Image Analysis*, 2000, pp. 253-268, XP002482596.
Lestrel, Pete E., "Introduction and Overview of Fourier Descriptors", *Fourier Descriptors and Their Applications in Biology*, 2001, pp. 22-44, XP008090742; ISBN: 978-0-521-45201-4.
Niemel, L. P. W. et al., "A Novel Description of Handwritten Characters for Use with Generalised Fourier Descriptors", *European Transactions on Telecommunications and Related Technologies*, AEI, Milano, IT, Sep. 1, 1992, pp. 455-464, XP000315364; ISSN: 1120-3862.
Sener, S. et al., "Affine Invariant Fitting of Algebraic Curves using Fourier Descriptors", *Pattern Analysis and Applications*, Springer-Verlag, vol. 8, No. 1-2, Sep. 1, 2005, pp. 72-83, XP019381480; ISSN: 1433-755X.
Unel, M. et al., "Fitting Circle Polynomials to Planar Objects", *Proc. of the First Workshop on Computer Vision, Pattern Recognition and Image Processing*; XP002482595 Oct. 23, 1998.
Wyatt, Harry J., "The Form of the Human Pupil", *Vision Research*; Pergamon Press, Oxford, GB, vol. 35, No. 14; XP001077732; ISSN: 0042-6989 Jul. 1, 1995 , 2021-2036.
Da Fontoura Costa, Luciano, "Estimating Derivatives and Curvature of Open Curves", *Pattern Recognition*, Elsevier, GB, Nov. 1, 2002, pp. 2445-2451; XP 004819285; ISSN: 0031-3203.
Oirrak, Ahmed El, "Affine Invariant Descriptors Using Fourier Series", *Pattern Recognition Letters*, Elsevier, Amsterdam, NL, Aug. 2002, pp. 1109-1118; XP004349759; ISSN: 0167-8655.

(Continued)

*Primary Examiner* — Vikkram Bali
*Assistant Examiner* — Daniel Zeilberger
(74) *Attorney, Agent, or Firm* — Ungaretti & Harris LLP

(57) ABSTRACT

A method of approximating the inner or outer boundary of an iris comprises generating an approximate boundary representation (20) comprising a least squares approximation by a cosine transform series of a function of the angle (θ) about a fixed point (A) of the distance of measured points (10) on the boundary from the fixed point (A). More broadly, the method may be used to approximate the shape of any two-dimensional curve or figure.

6 Claims, 1 Drawing Sheet

OTHER PUBLICATIONS

Ghosh, "An Algebra of Geometric Shapes", *IEEE Computer Graphics and Applications*, 1993, p. 50, U.S.

B. Bonney, et al., "Iris pattern extraction using bit planes and standard deviations", *Conference Record of the Thirty-Eighth Asilomar Conference on Signals, Systems and Computers*, 2004, U.S.

Y. Du, et al., "Analysis of Partial Iris Recognition Using a 1-D Approach", *Proceedings of the 2005 IEEE International Conference on Acoustics, Speech, and Signal Processing*, Mar. 18-23, 2005, U.S.

Vanicek, Petr; "Further Development and Properties of the Spectral Analysis by Least-Squares"; Dec. 7, 1970; Astrophysics and Space Science, vol. 12, 1971; pp. 10-33.

\* cited by examiner

SHAPE REPRESENTATION USING COSINE TRANSFORMS

CROSS-REFERENCE TO RELATED APPLICATIONS

None.

TECHNICAL FIELD

The present invention relates to shape representation using Cosine Transforms. The invention finds particular although not exclusive application in biometrics, for example, in the generation of approximate representations of the outer and/or inner boundary of the iris in the human eye.

BACKGROUND OF THE INVENTION

Ghosh and Jain ("An Algebra of Geometric Shapes", *IEEE Computer Graphics and Applications,* 1993, 50) describe the use of Fast Fourier Transforms (FFTs) to model the outline of a shape by tracking around its outer periphery.

It is of considerable importance in biometric systems that rely on iris recognition to be able to identify and map accurately both the outer edge of the iris and also the inner edge (the periphery of the pupil). Many iris recognition systems assume that the shape of the pupil is always circular, an assumption which may be inaccurate in many cases. Indeed, even when pupils are circular, they tend to become elongate or oblong when viewed from an angle.

Some research into non-circular pupil localisation has been carried out: See B. Bonney, R. Ives, D. Etter, and D. Yingzi, "Iris pattern extraction using bit planes and standard deviations," *Conference Record of the Thirty-Eighth Asilomar Conference on Signals, Systems and Computers,* 2004, Y. Du, B. L. Bonney, R. W. Ives, D. M. Etter, and R. Schultz, "Analysis of Partial Iris Recognition Using a 1-D Approach," *Proceedings of the 2005IEEE International Conference on Acoustics, Speech, and Signal Processing,* Mar. 18-23, 2005. However, in spite of these earlier approaches, there still remains a need for a system which can, in a straightforward way, approximate a boundary given a number of points (which may not be equally spaced) on that boundary.

SUMMARY OF THE INVENTION

According to a first aspect of the present invention there is provided a method of approximating an iris boundary, comprising the steps of:
  acquiring an image of an eye, including an iris boundary;
  noting a plurality of spaced boundary points on the boundary;
  selecting a fixed reference point; and,
  generating an approximate boundary representation comprising a least squares approximation by a cosine transform series as a function of angle about said fixed point of the distance of said boundary points from said fixed point.

Because the points on the boundary may not be equally spaced, standard methods of calculating coefficients such as the Discrete Cosine Transform (DCT) cannot be used.

Preferably, this method is used to map the inner boundary of the iris (or, equivalently, the outer boundary of the pupil) of a human eye. Alternatively, it may be used to map the outer iris boundary.

In the method described, the use of higher harmonics provides excellent pupil localisation, both on general and on non-ideal eye images. The method provides excellent results on the vast majority of pupils which are significantly non-circular.

According to a second aspect of the present invention, there is provided a method of approximating a two-dimensional shape, comprising the steps of:
  noting a plurality of spaced measured points on the shape;
  selecting a fixed reference point; and,
  generating an approximate shape representation comprising a least squares approximation by a cosine transform series as a function of angle about said fixed point of the distance of said measured points from said fixed point.

BRIEF DESCRIPTION OF THE DRAWINGS

The invention may be carried into practice in a number of ways and one specific embodiment will now be described, by way of example, with reference to the accompanying drawings, in which.

DETAILED DESCRIPTION

The way in which an embodiment of the invention may be applied to a particular problem, that of characterising a non-circular pupil shape, will now be described.

First, an eye may be imaged, and the image analysed to identify a plurality of points 10, which occur on the imaged pupil/iris boundary 12. To do this, an approximate pupil location may be first determined by searching for a dark area of significant size close to the image centre. A histogram analysis may then be carried out to find a more exact centre as well as the average pupil radius. This approximate circular pupil boundary may then be examined in detail to obtain the required number of edge points 10. In the preferred embodiment, 16 such points are identified. It will be understood by those skilled in the art that other methods may be employed to locate points on the pupil/iris boundary and the scope of the claimed subject matter is not limited in this respect.

It will also be understood that the points 10 may not necessarily be equally spaced around the edge of the pupil. Indeed, in some images, part of the boundary 14 may be obscured by an eyelid and/or eyelashes 16.

Figure 1:
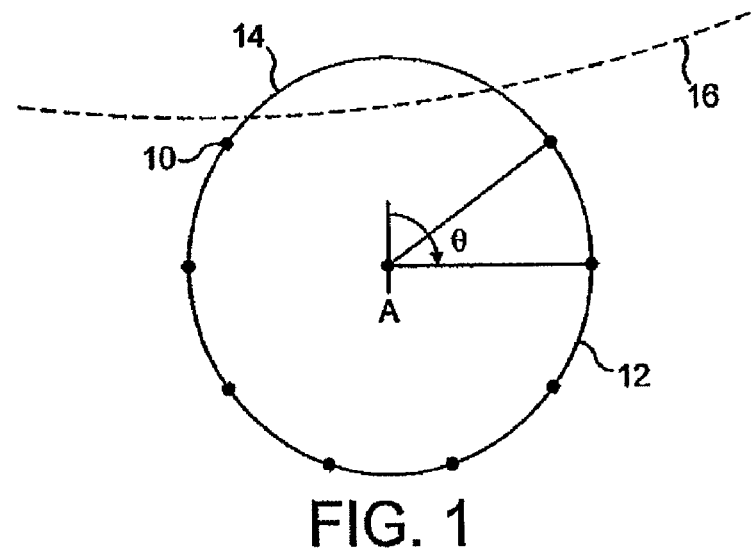
FIG. 1, shows a non-circular pupil shape, as imaged; and,
  FIG. 2, shows an approximation to that shape.
Figure 2:
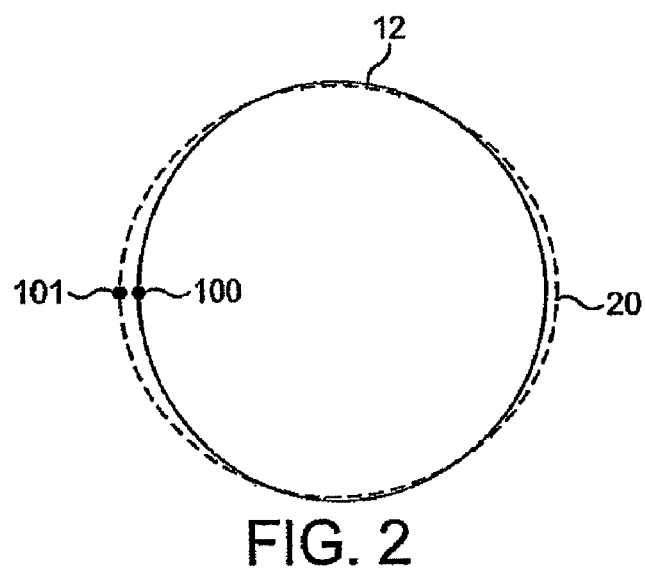

Once the boundary points 10 have been identified, those points can be used to generate a mathematical approximation 20 of the actual curve 12, as is shown in FIG. 2. In the present invention, the fitted curve 20 is a Cosine Transform least squares approximation, as a function of angle $\theta$, of the distance of the points 10 from a notional fixed point A (see FIG. 1).

We wish to describe the distance $d(\theta)$ of a curve in the plane from a known or assumed centre as a harmonic function of the angle $\theta$ the form of a variation of the 1D Discrete Cosine Transform (DCT). For simplicity, it will be assumed that the function $d(\theta)$ is single valued in $\theta$. The inverse transform from N coefficients $\{C_n; n=0 \ldots N-1\}$ is $$d(\theta) = \frac{C_0}{\sqrt{2}} + \sum_{n=1}^{N-1} C_n \cos n\left(\frac{\theta}{2} + \frac{\pi}{2N}\right)$$

A standard Discrete Cosine Transform is a fit of regularly spaced data related to the Chebyshev polynomial, which has equi-ripple properties between the sample points.

However, in the present application, the points to be fitted $\{r_i, \theta_i; i=1 \ldots M\}$ may be irregular in $\theta_i$.

If the error in the fit is $$E(\theta_i) = d(\theta_i) - r_i$$

Then we wish to find $\{C_n; n=0 \ldots N\}$ which minimizes the sum of squares of the error, $$E^2 = \sum_{i=1}^{M} E(\theta_i)^2 = \sum_{i=1}^{M} (d(\theta_i) - r_i)^2$$

$$= \sum_{i=1}^{M} \left[ \left\{ \frac{C_0}{\sqrt{2}} + \sum_{n=1}^{N-1} C_n \cos n\left(\frac{\theta}{2} + \frac{\pi}{2N}\right) \right\} - r_i \right]^2$$

To do this we differentiate with respect to $C_k$ and equate to zero:

$$\frac{\partial E^2}{\partial C_0} = \sum_{i=1}^{M} \sqrt{2} \left[ \frac{C_0}{\sqrt{2}} + \sum_{n=1}^{N-1} C_n \cos n\left(\frac{\theta_i}{2} + \frac{\pi}{2N}\right) - r_i \right] \cos k\left(\frac{\theta_i}{2} + \frac{\pi}{2N}\right)_i = 0$$

$$\frac{\partial E^2}{\partial C_k} = \sum_{i=1}^{M} 2\left[ \frac{C_0}{\sqrt{2}} + \sum_{n=1}^{N-1} C_n \cos n\left(\frac{\theta_i}{2} + \frac{\pi}{2N}\right) - r_i \right] \cos k\left(\frac{\theta_i}{2} + \frac{\pi}{2N}\right)_i = 0,$$

$$k = 1 \ldots N-1$$

from which $$\sum_{i=1}^{M} \frac{C_0}{\sqrt{2}} + \sum_{n=1}^{N-1} C_n \cos n\left(\frac{\theta_i}{2} + \frac{\pi}{2N}\right) = \sum_{i=1}^{M} r_i$$

$$\sum_{i=1}^{M} \left[ \frac{C_0}{\sqrt{2}} + \sum_{n=1}^{N-1} C_n \cos n\left(\frac{\theta_i}{2} + \frac{\pi}{2N}\right) \right] \cos k\left(\frac{\theta_i}{2} + \frac{\pi}{2N}\right) = \sum_{i=1}^{M} r_i \cos k\left(\frac{\theta_i}{2} + \frac{\pi}{2N}\right),$$

$$k = 1 \ldots N-1$$

This gives N linear equations in the unknowns $\{C_n; n=0 \ldots N-1\}$ which can be expressed in matrix form as $$PC = S$$

Where the unknowns are given by $$C = \begin{bmatrix} C_0 \\ C_1 \\ \vdots \\ C_N \end{bmatrix}$$

and the right hand side is given by $$S = \begin{bmatrix} S_0 \\ S_1 \\ \vdots \\ S_N \end{bmatrix}$$

where $S_k = \sum_{i=0}^{M} r_i \cos k\left(\frac{\theta_i}{2} + \frac{\pi}{2N}\right)$ The N by N matrix P is then $$P_{k,0} = \frac{1}{\sqrt{2}}$$

$$P_{k,n} = \sum_{i=1}^{M} C_n \cos n\left(\frac{\theta_i}{2} + \frac{\pi}{2N}\right) \cos k\left(\frac{\theta_i}{2} + \frac{\pi}{2N}\right)$$

for $k = 0 \ldots N-1$ and $n = 1 \ldots N-1$

The matrix P is symmetric. This can be solved using standard numerical methods for any M and N, giving an approximation by N coefficients to M given points:

$$C = P^{-1} S$$

Where $M \geq N$, the equations above minimise the Root Mean Square (RMS) error between each measured point 100 on the actual boundary, and the closest corresponding point 101 of the fitted boundary 20. When the number of coefficients is 1, the fitted curve is a circle, and as the number of coefficients increases the RMS error generally decreases. It has been found in practice that good results in iris approximation can be obtained by using 5 coefficients.

In addition to modelling the boundary of the pupil (or, equivalently, the inner boundary of the iris), the present embodiment may also be used to model the shape of the outer boundary of the iris. Once the inner and outer boundaries have been determined, biometric identification can proceed in the normal way based on the characteristics of the iris image between the inner and outer boundaries.

The position of the fixed point A (FIG. 1) is not of great importance, and although the approximate centre of the pupil is a convenient point to take other points are not excluded—even points which lie outside the boundary being fitted. Of course, if the fixed point lies outside the boundary, the resulting function will no longer be single valued in $\theta$, and a corresponding allowance for that will need to be made.

If there is a large variability in distances, an improved fit may sometimes be achieved using a multi pass approach: carry out a first fit, exclude any outliers which are greater than a cut-off value, and repeat the calculation. The cut-off value may be fixed, or may be data dependent, for example, a given number of standard deviations.

It will be understood that the method described above may find application in the fitting of a variety of other curves and/or boundaries, in addition to fitting of the inner and outer iris boundaries. With a suitable choice of fixed reference points, the method could even be used to approximate open shapes such as simple curve fragments.

I claim:

1. A method of approximating an iris boundary, comprising the steps of:
   acquiring an image of an eye, including an iris boundary;
   noting a plurality of unequally spaced boundary points on the boundary of the image;
   selecting a fixed reference point in the image; and
   generating an approximate boundary representation comprising a least squares approximation by a discrete cosine transform series as a function $$d(\theta) = \frac{C_0}{\sqrt{2}} + \sum_{n=1}^{N-1} C_n \cos n\left(\frac{\theta}{2} + \frac{\pi}{2N}\right)$$

of angle $\theta_i$ about said fixed point of the distance of said boundary points in the image from said fixed point;

the spaced boundary points being not all equally spaced in $\theta_i$, and in which said least-squares approximation minimizes the sum of squares of errors in the distances taken over the boundary points.

2. A method as claimed in claim 1 in which the approximate boundary representation is generated by numerically solving the system of linear equations $$PC=S$$

or a mathematical equivalent thereof, for the unknown matrix C, where:

$$C = \begin{bmatrix} C_0 \\ C_1 \\ \vdots \\ C_N \end{bmatrix} \text{ and } S = \begin{bmatrix} S_0 \\ S_1 \\ \vdots \\ S_N \end{bmatrix} \text{ where }$$

$$S_k = \sum_{i=0}^{M} r_i \cos k\left(\frac{\theta_i}{2} + \frac{\pi}{2N}\right)$$

and where P in an N by N matrix given by $$P_{k,0} = \frac{1}{\sqrt{2}} \text{ and}$$

$$P_{k,n} = \sum_{i=1}^{M} C_n \cos n\left(\frac{\theta_i}{2} + \frac{\pi}{2N}\right) \cos k\left(\frac{\theta_i}{2} + \frac{\pi}{2N}\right) \text{ for}$$

$$k = 0 \ldots N-1 \text{ and } n = 1 \ldots N-1.$$

3. A method as claimed in claim 1 in which the boundary is the pupil/iris boundary.

4. A method as claimed in claim 1 in which the boundary is the outer iris boundary.

5. A method as claimed in claim 1 in which the fixed reference point is in the approximate center of the iris boundary.

6. A method as claimed in claim 1 in which, following the generating step any boundary points which lie more than a selected distance from the boundary representation are excluded, and the generating step is then repeated.

\* \* \* \* \*

UNITED STATES PATENT AND TRADEMARK OFFICE
CERTIFICATE OF CORRECTION

PATENT NO. : 8,036,466 B2
APPLICATION NO. : 11/654494
DATED : October 11, 2011
INVENTOR(S) : Donald Martin Monro Page 1 of 1

It is certified that error appears in the above-identified patent and that said Letters Patent is hereby corrected as shown below:

In the Issued Patent, Column 5, lines 1-3, In Claim 1, delete

" $d(\theta) = \dfrac{C_0'}{\sqrt{2}} + \sum_{n=1}^{N-1} C_n \cos n\left(\dfrac{\theta}{2} + \dfrac{\pi}{2N}\right)$ " and insert -- $d(\theta) = \dfrac{C_0}{\sqrt{2}} + \sum_{n=1}^{N-1} C_n \cos n\left(\dfrac{\theta_i}{2} + \dfrac{\pi}{2N}\right)$ -- therefor

Signed and Sealed this
Thirteenth Day of December, 2011

David J. Kappos
*Director of the United States Patent and Trademark Office*